United States Patent
Romine et al.

(10) Patent No.: US 8,046,140 B2
(45) Date of Patent: *Oct. 25, 2011

(54) PTO OVERSPEED PROTECTION STRATEGY

(75) Inventors: Mike Romine, Oneonta, AL (US);
Gregg Andres, Kalamazoo, MI (US);
William J. Mack, Kalamazoo, MI (US);
David Brooks, Nashville, TN (US)

(73) Assignee: Eaton Corporation, Cleveland, OH (US)

( * ) Notice: Subject to any disclaimer, the term of this patent is extended or adjusted under 35 U.S.C. 154(b) by 739 days.

This patent is subject to a terminal disclaimer.

(21) Appl. No.: 12/016,745

(22) Filed: Jan. 18, 2008

(65) Prior Publication Data

US 2009/0187316 A1    Jul. 23, 2009

(51) Int. Cl.
*G06F 7/00* (2006.01)
*G06F 17/00* (2006.01)

(52) U.S. Cl. ........... 701/51; 701/53; 701/67; 701/79; 180/170; 180/174

(58) Field of Classification Search ........... 701/51–55, 701/67, 79; 180/170, 171, 174; 477/92
See application file for complete search history.

(56) References Cited

U.S. PATENT DOCUMENTS

| | | | |
|---|---|---|---|
| 3,400,601 A | 9/1968 | Ruhl Charles et al. | |
| 4,361,060 A | 11/1982 | Smyth | |
| 4,455,883 A | 6/1984 | Radcliffe | |
| 4,527,446 A | 7/1985 | Borodin | |
| 4,531,489 A * | 7/1985 | Sturdy | 123/320 |
| 4,550,627 A | 11/1985 | Lauer et al. | |
| 4,593,580 A | 6/1986 | Schulze | |
| 4,595,986 A | 6/1986 | Daubenspeck et al. | |
| 4,754,665 A | 7/1988 | Vandervoort | |
| 4,850,236 A | 7/1989 | Braun | |
| 4,899,607 A | 2/1990 | Stainton | |
| 4,920,815 A | 5/1990 | Reynolds | |
| 4,974,468 A | 12/1990 | Reynolds et al. | |
| 5,000,060 A | 3/1991 | Reynolds et al. | |
| 5,222,404 A | 6/1993 | Stine | |
| 5,272,929 A | 12/1993 | Fletcher et al. | |
| 5,272,931 A | 12/1993 | Daniel | |
| 5,281,902 A | 1/1994 | Edelen et al. | |

(Continued)

FOREIGN PATENT DOCUMENTS

GB    2 312 192 A    10/1997

(Continued)

OTHER PUBLICATIONS

International Search Report dated Dec. 9, 2009 from International Application No. PCT/IB2009/000082 (4 pages).

(Continued)

*Primary Examiner* — Gertrude Arthur Jeanglaud
(74) *Attorney, Agent, or Firm* — Rader, Fishman & Grauer PLLC

(57) ABSTRACT

An exemplary embodiment includes a method of operating a drivetrain. The drivetrain includes a PTO and a transmission having multiple speed ratios. The PTO includes a PTO output member and a PTO input member. The method includes monitoring a speed value representative of a rotational speed of a PTO component, comparing the speed value to a preselected PTO overspeed value, reducing the rotational speed of the PTO component, and overriding a manual command to increase the rotational speed of the PTO component above the preselected PTO overspeed value.

20 Claims, 3 Drawing Sheets

U.S. PATENT DOCUMENTS

| | | | |
|---|---|---|---|
| 5,370,013 A | 12/1994 | Reynolds et al. | |
| 5,390,561 A | 2/1995 | Stine | |
| 5,435,212 A | 7/1995 | Menig | |
| 5,528,950 A | 6/1996 | Organek et al. | |
| 5,546,823 A | 8/1996 | Stine et al. | |
| 5,549,185 A | 8/1996 | Kale | |
| 5,582,069 A | 12/1996 | Genise | |
| 5,582,558 A | 12/1996 | Palmeri et al. | |
| 5,609,062 A | 3/1997 | Reynolds | |
| 5,611,242 A | 3/1997 | Santachiara | |
| 5,611,751 A * | 3/1997 | Ehrenhardt et al. | 477/73 |
| 5,620,392 A | 4/1997 | Genise | |
| 5,642,643 A | 7/1997 | Reynolds et al. | |
| 5,651,292 A | 7/1997 | Genise | |
| 5,661,998 A | 9/1997 | Genise | |
| 5,679,096 A | 10/1997 | Stine et al. | |
| 5,682,790 A | 11/1997 | Genise | |
| 5,706,199 A * | 1/1998 | Wilson et al. | 701/93 |
| 5,713,443 A | 2/1998 | Kronstadt | |
| 5,713,445 A | 2/1998 | Davis et al. | |
| 5,735,771 A | 4/1998 | Genise | |
| 5,974,354 A | 10/1999 | Janecke et al. | |
| 5,974,906 A | 11/1999 | Stine et al. | |
| 6,015,366 A | 1/2000 | Markyvech et al. | |
| 6,080,081 A | 6/2000 | Sauermann et al. | |
| 6,123,643 A | 9/2000 | Davis et al. | |
| 6,463,823 B2 | 10/2002 | Walker | |
| 6,564,663 B2 | 5/2003 | Rioux et al. | |
| 6,658,339 B1 | 12/2003 | Wright et al. | |
| 7,104,920 B2 | 9/2006 | Beaty et al. | |
| 7,234,367 B2 | 6/2007 | Hou et al. | |
| 7,318,788 B2 | 1/2008 | Karisson et al. | |
| 7,347,804 B2 | 3/2008 | Steen et al. | |
| 7,905,812 B2 * | 3/2011 | Romine | 477/92 |
| 2002/0032100 A1 | 3/2002 | Walker | |
| 2007/0209902 A1 | 9/2007 | Muetzel et al. | |
| 2008/0092676 A1 | 4/2008 | Steinborn et al. | |

FOREIGN PATENT DOCUMENTS

| | | |
|---|---|---|
| WO | WO-00/52549 A2 | 9/2000 |
| WO | WO-2007/030072 A1 | 3/2007 |

OTHER PUBLICATIONS

Final Office Action dated Nov. 10, 2009 in U.S. Appl. No. 11/701,582. (9 pages).

Office Action dated Jun. 7, 2010 for corresponding U.S. Appl. No. 11/701,582 (11 pages).

\* cited by examiner

PTO OVERSPEED PROTECTION STRATEGY

CROSS REFERENCE TO RELATED APPLICATIONS

This application claims priority to U.S. patent application Ser. No. 11/701,582, filed Feb. 2, 2007, the disclosure of which is incorporated by reference in its entirety.

TECHNICAL FIELD

The disclosure generally relates to vehicles with a power take off (PTO) drive, and specifically to operation of PTO drives of a vehicle

BACKGROUND

Many vehicles are provided with a power take off (PTO) drive. The engines for these vehicles are typically fuel throttle controlled, preferably electronically, and are generally connected to an electronic data link of the type defined in, for example. SAE J1922 and/or SAE J1939 protocol. The electronically controlled engine is usually provided with its own electronic control unit (ECU). An input shaft brake may be incorporated that provides quicker manual upshifting as is well known in the prior art. It is understood that a data link or databus complying with SAE J1922, SAE J1939, CAN and/or ISO 11898 protocols, or similar protocols, carries information indicative of engine torque, engine speed, transmission output shaft speed. PTO speed, and brake information.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference in their entirety.

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference in their entirety. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems may be seen by reference to U.S. Pat. Nos. 4,455,883; 4,550,627; 4,899,607; 4,920,815; 4,974,468; 5,000,060; 5,272,931; 5,281,902; 5,222,404; and 6,463,893, the disclosures of which are incorporated herein by reference in their entirety. U.S. Pat. No. 4,527,446, the disclosure of which is incorporated herein by reference in its entirety, discloses a fully automated, blocked-type transmission wherein the main section is automatically shifted to main section neutral during each shift.

PTO systems for vehicle drivetrains may be seen by reference to U.S. Pat. Nos. 5,070,982 and 6,497,313, and typically include a PTO synchronizing clutch, or hot-shift clutch, to synchronize and engage PTO input and output components, such as shafts, gears, or clutch members. Some systems include a PTO where some components may be damaged if operated during maximum engine rotational speed. In these applications, when the engine is operated at an undesirable speed, the PTO clutch may be used for disengaging the PTO driven device until the engine speed is reduced.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
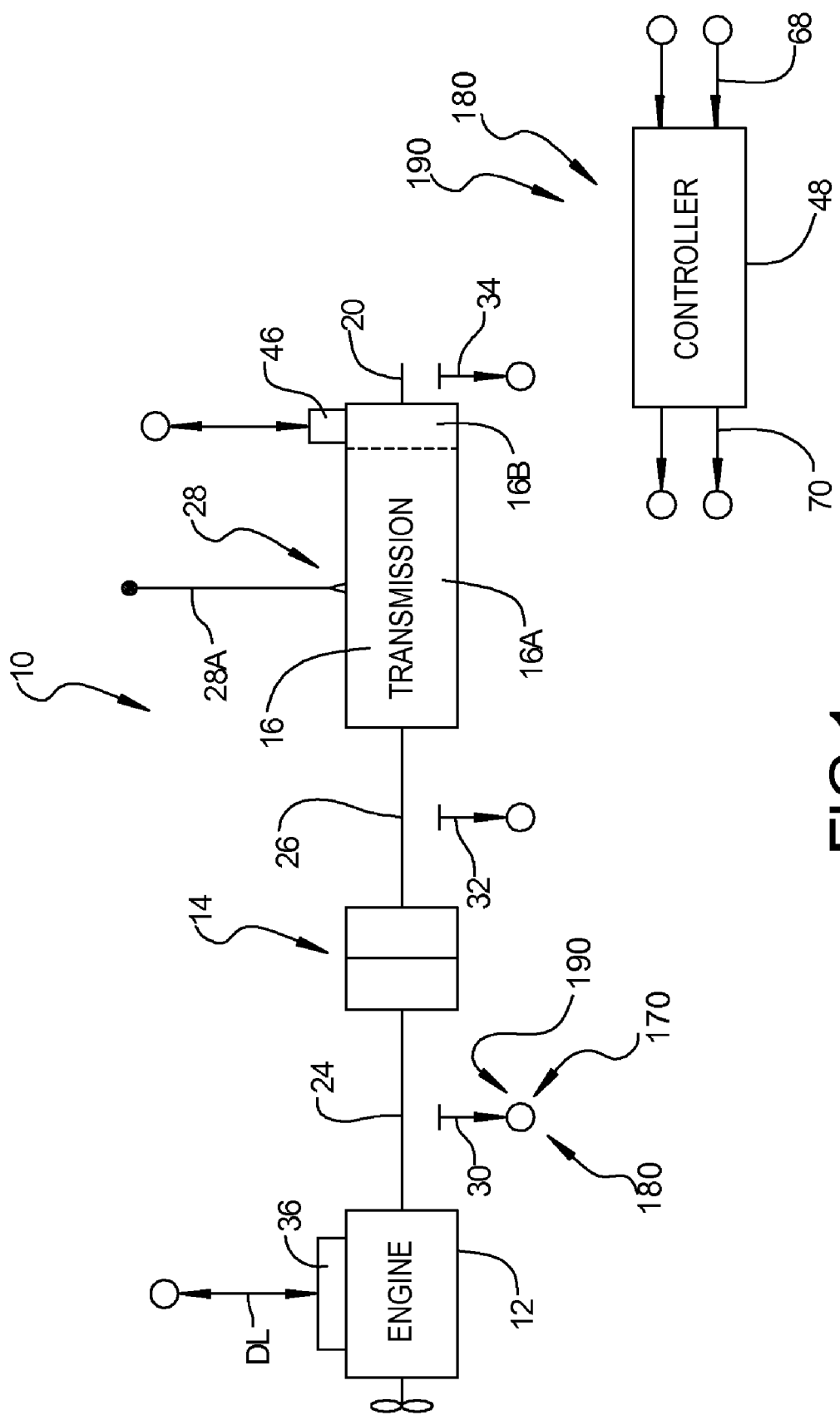
FIG. 1 is a schematic illustration of an ECU-assisted, non-synchronized compound mechanical drivetrain system according to an embodiment.

FIG. 1 illustrates a computer-assisted (i.e., microprocessor-based, controller-assisted) vehicular compound mechanical drivetrain system 10. The drivetrain system 10 may be of the type commonly utilized in heavy-duty vehicles, such as the conventional tractors of tractor/semi-trailer vehicles, and includes an engine, typically a diesel engine, a master friction clutch contained within a clutch housing, a multiple-speed compound transmission and a drive axle assembly (not shown).

In the exemplary embodiment illustrated, system 10 includes an engine 12, a transmission clutch 14, and a transmission 16. The transmission 16 includes an output shaft 20 drivingly coupled to a vehicle drive shaft by a universal joint for driving the drive axle assembly. The transmission 16 is housed within a transmission housing to which is directly mounted the shift tower of the shift lever assembly 28. The present system is equally applicable to remotely mounted shift levers, as are used in cab-over-engine types of vehicles.

In the exemplary embodiment illustrated, the main clutch 14 is a centrifugal clutch that engages the engine 12 for rotation with the transmission 16 at above about 1200 rotations per minute (RPM). While system 10 is illustrated with a manual shift lever and centrifugal clutch, this is for illustrative purposes only and not intended to be limiting. Transmission 16, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 5,370,013; 5,974,354; 5,974,906; and 6,015,366, the disclosures of which are incorporated herein by reference.

Typically, the shift lever assembly 28 will include a shift finger or the like (not shown) extending downwardly into a shifting mechanism (not shown), such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931. Collectively, the main section 16A the shift lever assembly 28 comprise a shifting system Shifting of transmission 16, comprising non-synchronized main section 16A coupled in series to auxiliary section 16B, is semi-automatically implemented/assisted by the vehicular transmission system 10. Main section 16A includes an input shaft 26, which is operatively coupled to the drive or crank shaft 24 of the vehicle engine 12 by master clutch 14, and output shaft 20 of auxiliary section 16B is operatively coupled, commonly by means of a drive shaft, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 28A according to the shift pattern prescribed to engage the particular desired gear ratio.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor. As is also known, the rotational speed (OS) of the output shaft 20 is indicative of vehicle ground speed.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor (not shown) may be provided or throttle position (THL) may be sensed from the data link. Gross engine torque (TEG) and base engine friction torque (TBEF) also are available on the data link.

Figure 2:
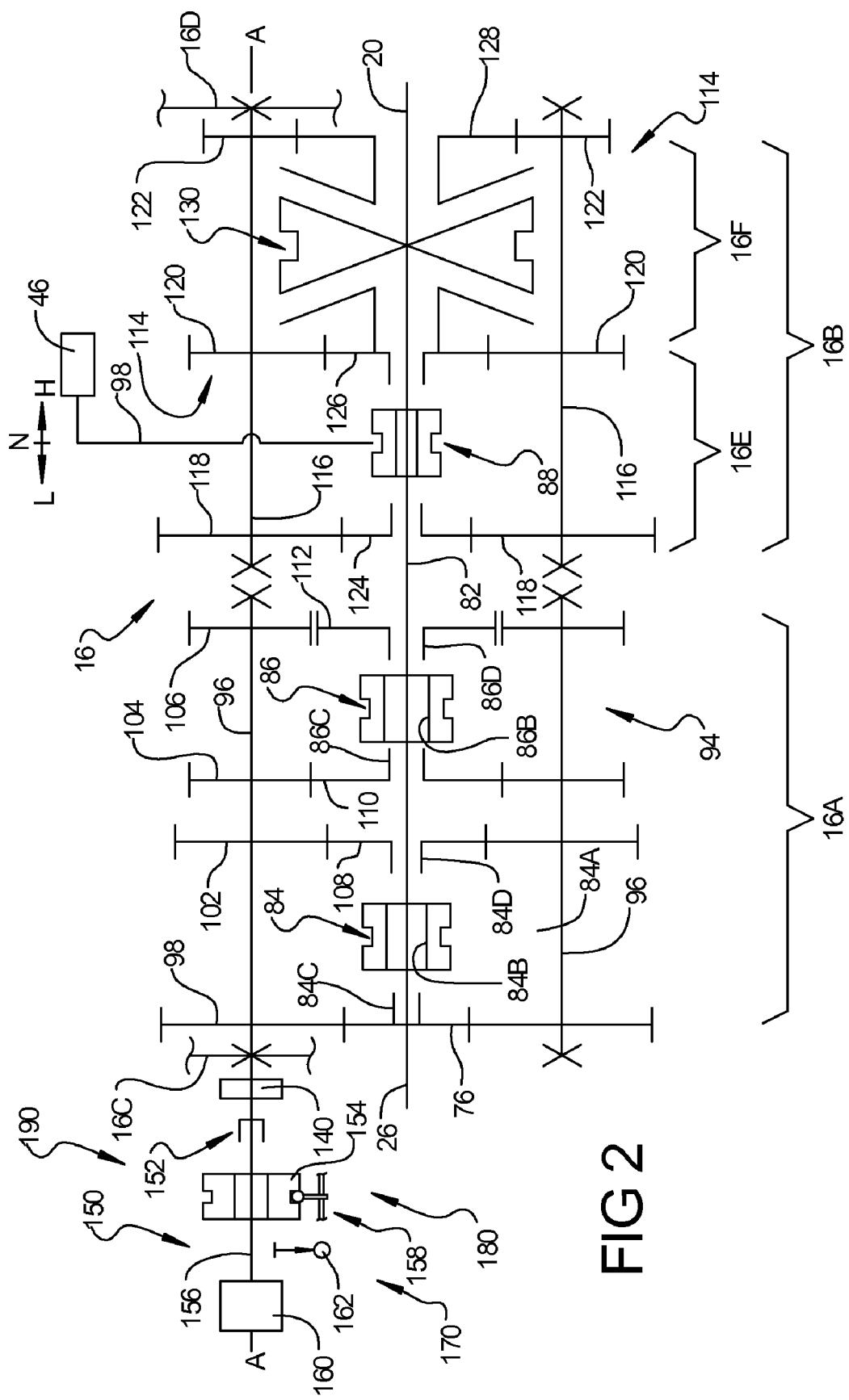
FIG. 2 is a schematic illustration of the structure of the compound mechanical transmission of FIG. 1.

With reference to FIGS. 1 and 2, the system 10 includes a control unit or ECU 48, such as a microprocessor-based control unit of the type illustrated in U.S. Pat. Nos. 4,595,986; 4,361,056 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or a display. A separate system controller may be utilized, or the engine electronic controller 36, communicating over an electronic data link DL, may be utilized during shifting, as desired. In the exemplary embodiment illustrated, the throttle position (operator demand) is communicated to the ECU 48 via the data link DL and the engine electronic controller 36 while the ECU 48 sends commands to the data link DL and the engine electronic controller 36. Specifically, the ECU 48 is operable to detect the speeds of multiple rotational components within the system 10 while controlling the speed of these components (such as the shaft 24 of the vehicle engine 12, the input shaft 26 of the transmission 16, the PTO input member 152, the PTO output member 154, the PTO output shaft 156, the PTO driven device 160, or the output shaft 20 of the transmission 16).

A sensor (not shown) provides a signal (CL) indicative of clutch-engaged or disengaged condition. The condition of the clutch also may be determined by comparing engine 12 speed to input shaft 26 speed if both signals are available. An auxiliary section actuator 44 including a range shift actuator and a splitter actuator 46 is provided for operating the range clutch (shown as 130 in FIG. 2) and the splitter section clutch (shown as 88 in FIG. 2) in accordance with command output signals from ECU 48.

As shown in aforementioned U.S. Pat. Nos. 5,651,292 and 5,661,998, the splitter actuator 46 may be a three-position device, allowing a selectable and maintainable splitter-section-neutral. Alternatively, a "pseudo" splitter-neutral may be provided by de-energizing the splitter actuator when the splitter clutch is in an intermediate, non-engaged position.

The structure of the 10-forward-speed combined range-and-splitter-type synchronized transmission 16 is schematically illustrated in FIG. 2. Transmissions of this general type are disclosed in aforementioned U.S. Pat. Nos. 5,000,060; 5,370,013 and 5,390,561.

Transmission 16 includes a non-synchronized main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith. The mainshaft 82 carries a splined mainshaft first jaw clutch 84 and a second jaw clutch 86, and the mainshaft splitter clutch 88. Shift forks (not shown) are provided for axially moving the clutches 84 and 86 relative to the mainshaft 82 and are controlled by shift lever 28A acting on the shift assembly 28, as is known. Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. At least one of the countershafts 96 is provided for driving a PTO or the like.

The auxiliary section 16B of transmission 16 includes a splitter section 16E and a range section 16F. Auxiliary section 16B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 nor gear 126 is clutched to the main shaft. Splitter jaw clutch 88 is axially positioned by means of a shift fork 132 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1).times.(2.times.2)" type transmission providing nine or ten selectable forward speeds, depending upon the desirability and practicality of splitting the low gear ratio.

Preferably, splitter shifting of transmission 16 is accomplished responsive to initiation by a vehicle operator-actuated splitter button or the like, usually a button located at a knob of the shift lever 28A, while operation of the range clutch shifting assembly is an automatic response to movement of the gear shift lever 28A between the central and rightwardmost legs of the shift pattern, as illustrated in FIG. 2. Alternatively, splitter shifting may be automated (see e.g. for example, U.S. Pat. No. 5,435,212). Range shift devices of this general type are known in the prior art and may be seen by way of example in aforementioned U.S. Pat. Nos. 3,429,202; 4,455,883; 4,561,325, 4,663,725, and 6,463,823.

As best seen in the exemplary embodiment of FIG. 2, an inertia brake 140 is coupled to one of the countershafts 96 and the housing 16C. The inertia brake 140 may be used to selectively retard the rotational speed of countershafts 96 and input shaft 26 for a hill holding function and/or a synchronizing function during shifting.

Inertia brakes are typically relatively low-capacity friction devices operated automatically. In an embodiment that includes a manually actuated clutch, overtravel of the clutch pedal may be sensed and used as an input for operation of an inertia brake, such as the inertia brake 140, to synchronize the gearset to be engaged.

In the embodiment illustrated, one of the countershafts 96 is also coupled to a PTO 150. The PTO 150 includes a PTO input member 152, a PTO output member 154, a PTO output shaft 156 having an axis A-A, a PTO engaging device 158, and a PTO driven device 160. In the embodiment illustrated, the PTO output member 154 is a jaw clutch, splined to the PTO output shaft 156 and axially moveable by the PTO engaging device 158 relative to the PTO output shaft 156 in order to mesh the PTO output member 154 with the PTO input member 152, similar to clutches 84 and 86 above. That is, the PTO input member 152 and the PTO output member 154 are selectively engageable and disengagable to provide torque from system 10 to the PTO 150, as desired. The ECU 48 also includes a PTO output shaft speed sensor 162 for detecting the speed of the PTO output shaft 156. While the PTO 150 and the inertia brake 140 are illustrated adjacent one another at one end of a countershaft 96, the PTO 150 and the inertia brake 140 may be coupled to the system 10 at other locations.

The ECU 48 preferably monitors parameters of the system 10, or representative values of these parameters, such as the engine 12 speed sensor 30, the PTO output shaft speed sensor 162, the countershaft 96 rotational speed. The ECU may also provide a command for engagement of the PTO output member 154 with the PTO input member 152, and for actuation of the inertia brake 140. In the embodiment illustrated, the ECU 48 includes the logic for engaging the PTO 150 for rotation with the system 10, via engaging device 158, although this logic may be included in other suitable controllers.

Figure 3:
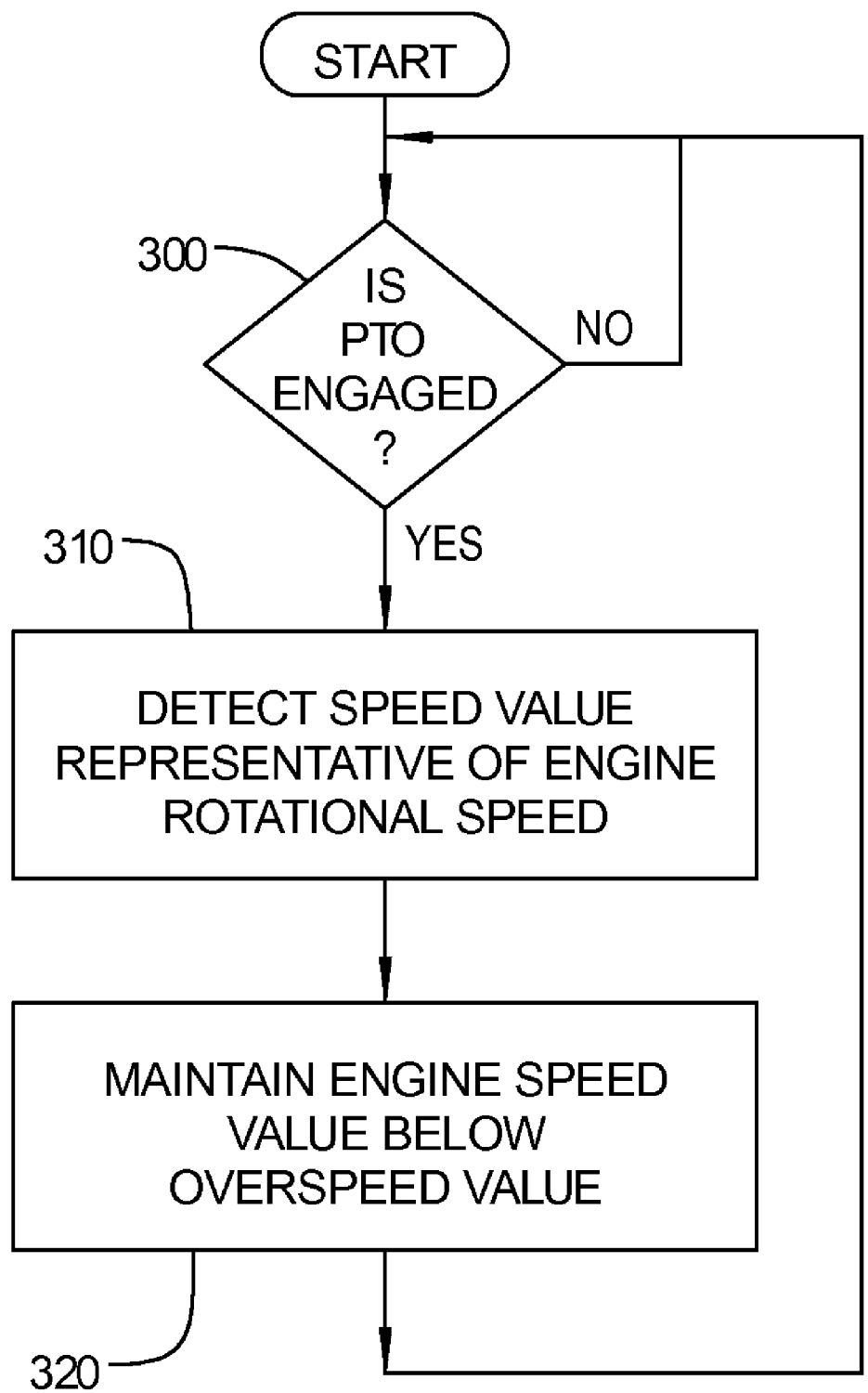
FIG. 3 is a schematic illustration, in flow chart format, of a control system, according to an embodiment.

FIG. 3 illustrates a flow chart of a method for protecting the PTO 150 and/or the PTO driven device 160 from overspeed damage. That is, excessive rotational speeds of the PTO 150 and/or the PTO driven device 160 may result in undesirable damage. In applications where the engine 12 or other driving device is capable of transmitting an excessive rotational speed to the PTO 150 and/or the PTO driven device 160, the ECU 48 may operate as illustrated in the exemplary embodiment described below.

An exemplary embodiment of a method of PTO overspeed protection is as follows. In Step 300, the ECU 48 will detect whether the PTO 150 is engaged by detecting whether the PTO output shaft 156 is rotating. In Step 310, the ECU will determine if the PTO 150 rotational speed is greater than a predetermined desired overspeed value. That is, the ECU 48 will detect whether the engine 12 has reached or is expected to reach a speed that would result in the PTO being rotated at a speed that is above a desired overspeed value. In the embodiment illustrated, the desired overspeed value is a speed that is expected to result in damage to either the PTO 150 or the PTO driven device 160. Collectively, the portion of the ECU 48 that performs the functions described herein, the PTO engaging device 158, and the sensors (specifically the engine rotational speed sensor 30 and/or the PTO output shaft speed sensor 162) described herein comprise a PTO overspeed protection system.

If the determination of Step 300 is positive, the operation proceeds to Step 310. If the determination of Step 300 is negative, the operation returns to Step 300.

In Step 310, a speed value representative of the engine speed value is detected. This speed value may be the rotational speed of any rotational component, including the shaft 24 of the vehicle engine 12, the input shaft 26 of the transmission 16, the PTO input member 152, the PTO output member 154, the PTO output shaft 156, the PTO driven device 160, or the output shaft 20 of the transmission 16.

In Step 320, the speed value is maintained below the overspeed value. That is, the speed value that is monitored, for example, either the PTO input member 152 speed, or the engine 12 speed, is compared to a value that represents an undesired value. If the speed value is expected to exceed the overspeed value, the engine 12 rotational speed is reduced by the ECU 48. In one embodiment, a J1939 data link that controls engine speed is used to limit fuel to the engine 12 via the engine electronic controller 36 in order to control the detected speed value. Additionally, the J1939 link may send an engine speed limit command to the engine electronic controller 36 where the engine electronic controller 36 may prevent an engine speed above a value of about the overspeed value and the engine speed limit command will override an operator's manual command for increased engine speed. Further, the ECU 48 may override any manual input (such as a manual operator demand for throttle input within the engine electronic controller 36).

Additionally, the ECU 48 may monitor the speed value and reduce the rotational speed of a PTO component when the speed value is within a predetermined tolerance of the overspeed value. As an illustrative example, the overspeed value may be 2000 rotations per minute (rpm) and the predetermined tolerance may be 100 rpm, resulting in the ECU 48 taking actions to reduce the speed value when the speed value increases above 1900 rpm.

In the exemplary embodiments described herein, the ECU 48 is programmed with a value for engine 12 rotational speed that results in operation of the PTO 150 at or above a desired maximum operating speed, although the ECU 48 may also monitor the PTO output shaft speed sensor 162 for an input representative of the rotational speed of the PTO output shaft 156. Additionally, the ECU 48 may be programmed with differing engine 12 rotational speeds that correlate to differing desired maximum operating speeds, such as a maximum PTO engaging section speed (to protect members 152, 154, and shaft 156 and related bearings and seals), and a maximum PTO driven device 160 rotational speed to protect a selected PTO driven device 160. Further, for driveline systems that may have more than one PTO driven device 160, the ECU 48 may have an input for determining which PTO driven device is being rotated and disengage the PTO(s) 150 when a corresponding undesirable excessive speed is reached.

The overspeed protection method described herein provides the system 10 with an automatic overspeed protection while not relying upon an operator to limit PTO speed. Additionally, the overspeed protection method prevents the operator from damaging the PTO due to inattention or misuse that may result from excessive PTO speeds.

Although the steps of the operating the system 10 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A powertrain system comprising:
a multispeed transmission defining a plurality of speed ratios;
a power take off (PTO) having a PTO input member selectively rotationally engaged with a PTO output member;
a detection system for detecting a value representative of a speed of the PTO output member; and
a controller in communication with the detection system and having an output for overriding a manual input to increase the rotational speed of the PTO output member above a predetermined overspeed value.

2. The system of claim 1, wherein the controller selectively communicates a command to reduce the rotational speed of at least a portion of the PTO.

3. The system of claim 1, wherein the detection system detects a value representative of a rotational speed of at least one of the PTO input member and the PTO output member.

4. The system of claim 1, wherein at least a portion of the PTO input member is selectively engaged with at least a portion of the PTO output member.

5. The system of claim 4, further comprising a PTO clutch for selectively disengaging the PTO input member with the PTO output member.

6. The system of claim 1, further comprising an output shaft for transmitting torque from the transmission to drive wheels of a vehicle, wherein torque transmitted through the PTO cannot be transmitted to the drive wheels.

7. The system of claim 1, further comprising an engine electronic controller for, at least in part, limiting the speed of an engine.

8. A method of operating a drivetrain, the drivetrain including a PTO and a transmission having multiple speed ratios, the PTO including a PTO output member and a PTO input member, the method comprising:
monitoring a speed value representative of a rotational speed of a PTO component;
comparing the speed value to a preselected PTO overspeed value;
reducing the rotational speed of the PTO component when the speed value is within a predetermined tolerance of the overspeed value; and
overriding a manual command to increase the rotational speed of the PTO component above the preselected PTO overspeed value.

9. The method of claim 8, wherein reducing the rotational speed of the PTO component when the speed value is within a predetermined tolerance of the overspeed value includes limiting the volumetric flow of fuel to an engine.

10. The method of claim 8, wherein overriding a manual command to increase the rotational speed of tile PTO component above the preselected PTO overspeed value includes limiting the volumetric flow of fuel to an engine.

11. The method of claim 8, wherein reducing the rotational speed of the PTO component when the speed value is within a predetermined tolerance of the overspeed value does not include rotationally disengaging the PTO output member from the PTO input member.

12. The method of claim 8, further comprising transmitting torque from the transmission to drive wheels of a vehicle, wherein torque transmitted through the PTO cannot be transmitted to the drive wheels.

13. The method of claim 8, wherein reducing the rotational speed of the PTO component when the speed value is within a predetermined tolerance of the overspeed value includes stopping at least one of the PTO output member and the PTO input member.

14. The method of claim 8, a PTO clutch selectively disengaging the PTO input member and the PTO output member, and wherein maintaining the rotational speed of the PTO component below the preselected PTO overspeed value does not include rotationally disengaging the PTO output member from the PTO input member.

15. A method of operating a drivetrain, the drivetrain including a multispeed transmission, an engine, and a main clutch operably interposed between the engine and the transmission, the method comprising:
monitoring a speed value representative of a rotational speed of a PTO component;
comparing the speed value to a preselected PTO overspeed value;
maintaining the rotational speed of the PTO component below the preselected PTO overspeed value; and
overriding a manual command to increase the rotational speed of the PTO component above the preselected PTO overspeed value.

16. The method of claim 15, further comprising maintaining the rotational speed of the PTO component below the preselected PTO overspeed value by, at least in part, limiting the volumetric flow of fuel to the engine.

17. The method of claim 15, a PTO clutch selectively disengaging the PTO input member and the PTO output member, and wherein maintaining the rotational speed of the PTO component below the preselected PTO overspeed value does not include rotationally disengaging the PTO output member from the PTO input member.

18. The method of claim 15, further comprising transmitting torque from the transmission to drive wheels of a vehicle, wherein torque transmitted through the PTO cannot be transmitted to the drive wheels.

19. The method of claim 15, wherein overriding a manual command to increase the rotational speed of the PTO component above the preselected PTO overspeed value includes limiting the volumetric flow of fuel to an engine.

20. The method of claim 15, wherein maintaining the rotational speed of the PTO component below the preselected PTO overspeed value includes stopping one of the PTO output member and the PTO input member.

* * * * *